April 25, 1967   E. J. HUNTER   3,315,696
METERING PISTON VALVE WITH CLEANING MEANS
Filed Aug. 24, 1964   2 Sheets-Sheet 1

INVENTOR.
EDWIN J. HUNTER
BY Lyon & Lyon
ATTORNEYS

INVENTOR.
EDWIN J. HUNTER
BY Lyon & Lyon
ATTORNEYS

United States Patent Office 3,315,696
Patented Apr. 25, 1967

3,315,696
METERING PISTON VALVE WITH
CLEANING MEANS
Edwin J. Hunter, Riverside, Calif., assignor to Moist O'Matic, Inc., Riverside, Calif., a corporation of Minnesota
Filed Aug. 24, 1964, Ser. No. 391,802
2 Claims. (Cl. 137—244)

ABSTRACT OF THE DISCLOSURE

A pilot operated valve having a reciprocable valve element pierced by a metering port through which extends a metering pin, and a bleed port which is closed by the valve element as it moves to fully open position so that when open, the valve element performs a wiping action on the metering pin.

This invention relates to piston valves, that is to valves wherein the moving element is a piston which is moved to and from its valve seat by pressure differences across the piston.

Included in the objects of this invention are:

First, to provide a piston valve which is particularly applicable as a remote control valve where pressure is applied or withdrawn from behind the piston element to effect control of the valve.

Second, to provide a piston valve wherein the moving element is a single-piece member having integral sealing lips to form the piston portion of the member as well as an integral valve seat portion for cooperation with a fixed valve seat.

Third, to provide a piston valve which utilizes uniquely related plastic materials for the valve body and the moving valve element, the plastic materials having an unique antifriction relation to insure smooth valve operation.

Fourth, to provide a piston valve, one form of which is also disclosed as a part of my copending application Ser. No. 356,875, filed Apr. 2, 1964, for Water Pressure Sequenced Irrigation System.

Fifth, to provide a dependable, inexpensive piston valve which has a wide range of use.

Sixth, to provide a piston valve which in one form utilizes a small pin-controlled orifice for control of pressurizing fluid from the upstream side of the valve and which is so arranged that the piston valve element oscillates while in its open position to maintain the orifice pin and its aperture free of deposits or clogging material.

With the above and other objects in view, as may appear hereinafter, reference is directed to the accompanying drawings in which.

Figure 1:
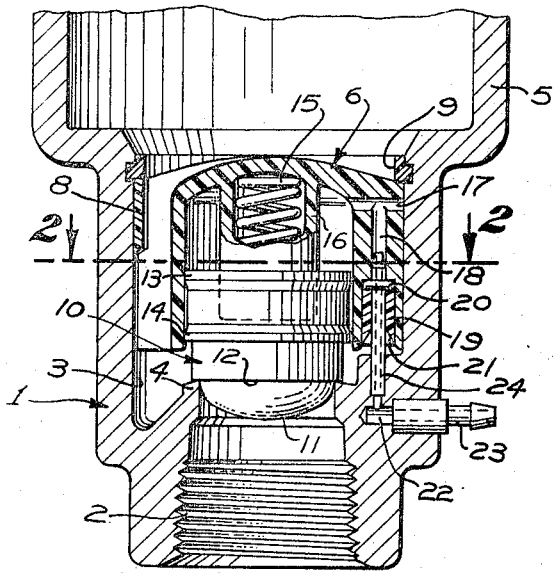
FIGURE 1 is a fragmentary sectional view showing one form of the piston valve, this form being more fully disclosed in my copending application Ser. No. 356,875, filed Apr. 2, 1964.
Figure 2:
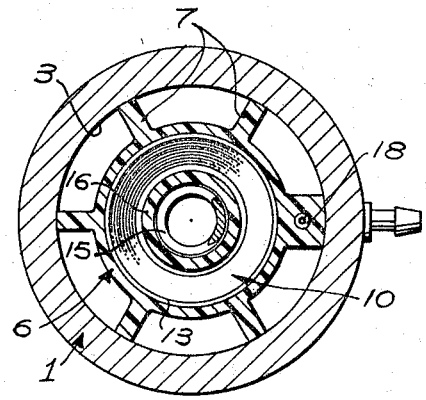
FIGURE 2 is a transverse sectional view thereof taken through 2—2 of FIG. 1.
Figure 3:
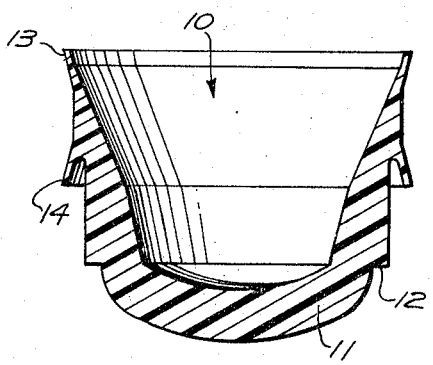
FIGURE 3 is an enlarged sectional view of the piston valve member.

Reference is first directed to FIGS. 1, 2, and 3. The construction here shown is particularly adapted for integral connection to the lower end of a sprinkler, more fully described in my copending application Ser. No. 356,875. This construction includes a valve body 1 having an internal screw thread inlet 2 at its lower end.

Above the inlet end, the body member is enlarged to form a counterbore 3 forming with the inlet end of a shoulder defining an annular fixed valve seat 4. The upper end of the counterbore forms the discharge end of the valve and above this end the valve body is further enlarged to form a housing 5 for a sprinkler. Alternatively, the upper end may be joined to a conventional screw fitting for incorporation in a flowline.

The counterbore 3 receives a valve cylinder 6 in the form of an inverted cup having cylindrical walls. Ribs 7 extend radially from the cylinder to the walls of the counterbore 3 and the upper portions are surrounded by an integral band 8. Immediately above the valve cylinder 6, the counterbore 3 is provided with a groove which receives a split retainer ring 9 for securing the valve cylinder in place.

The open end of the valve cylinder 6 is disposed in coaxial relation with the fixed valve seat and passages are formed between the ribs 7 for flow of fluid through the valve body.

The valve cylinder receives a piston valve member 10 molded of a polyethylene resin of low or medium density. The piston valve member is essentially cup-shaped to provide a closed end 11 in which is formed an integral valve seat 12 constituting a traveling valve seat which engages the fixed valve seat 4.

The upper extremity of the side walls of the piston valve member tapers to form a relatively thin annular sealing lip 13. A second relatively thin annular sealing lip 14 is formed by an axially directed groove located intermediate the ends of the piston valve member. The sealing lips 13 and 14 engage the walls of the valve cylinder 6 to form fluid-tight seals.

A compression spring 15 is interposed between the closed ends of the valve cylinder 6 and the piston valve member 10. The spring is maintained in position by a spring guide 16. The spring urges the piston valve member toward its closed position and also urges the valve cylinder 6 against the retainer ring 9.

One of the ribs 7 is enlarged and is provided with a radial bore 17 communicating with the interior of the valve cylinder 6. The outer end of the bore 17 may be closed by a small plug or the outer surface of the rib 7 may be such as to sealingly engage the confronting wall of the counterbore 3. The radial bore 17 is intersected by an axial bore 18 extending to the lower end of the enlarged rib. The lower end of the radial bore 18 is enlarged and receives an annular plug 19. An annular groove is formed by the plug and the upper end of the enlarged portion of the axial bore. This groove receives an O-ring 20. The lower end of the plug 19 is provided with a conical recess 21.

Near the entrance end of the valve body 1 is a radial pressure fluid port 22 having a fitting 23. The pressure fluid port is intersected by an axial bore which receives a tubular pin 24 so located that when the valve cylinder 6 is inserted in the counterbore 3, the tubular pin 24 passes through the O-ring 20 so as to provide a fluid passage from the fitting 23 to the interior of the counterbore 3.

It is particularly desirable that at least the valve cylinder 6 be molded of acetal resin, more particularly a linear acetal polymer consisting of unbranched polyoxymethylene chains:

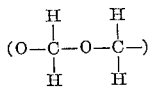

of great length normally averaging more than 1,000 $CH_2O$ units.

By forming the piston valve member 10 from a polyethylene resin and by forming the cylinder from a acetal resin, a dependable seal is obtained between the piston valve member and the valve cylinder. In addition to an effective seal, the coefficient friction between these two plastic materials is remarkably low, such that minimum force is required to initiate relative sliding movement between the piston valve member and the valve cylinder even though the parts may have been at rest for long periods and in a dry condition. Still further, it will be noted the piston valve member is molded as a single piece.

Operation of the piston valve shown in FIGS. 1, 2, and 3 is as follows:

If a pressure fluid equal or above the pressure of the fluid at the inlet of the valve body is maintained in the valve cylinder 6 above the piston valve member 10, the piston valve will be held in its closed position as shown in FIG. 1. When the pressure fluid is bled from the valve chamber, the upstream pressure forces the valve open.

Figure 4:
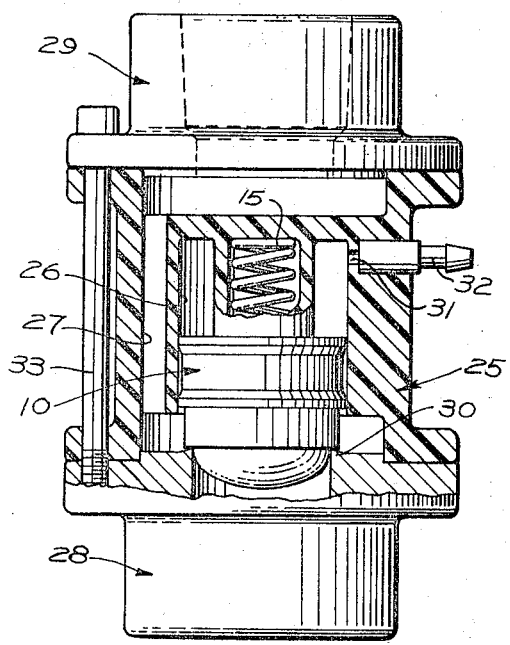
FIGURE 4 is a partial sectional, partial side view of a modified construction, the piston valve member, however, being similar to that shown in FIGS. 1, 2, and 3.

Reference is now directed to FIG. 4. In this construction, the piston valve member 10 may be identical to the construction shown in FIG. 1. The valve body 25 in this case is essentially cylindrical and includes a central valve cylinder 26 corresponding to the valve cylinder 6. The valve cylinder is surrounded by a ring of flow passages 27 communicating between the ends of the valve body.

The ends of the valve body are flanged for connection to an inlet member 28 and an outlet member 29. The inlet member is provided with a fixed valve seat 30 in coaxial relation with the cylinder 26. A pressure fluid port 31 extends radially from the valve cylinder 26 and is provided with a fitting 32. The inlet and outlet members are secured to the valve body by bolts 33.

Operation of the modified valve structure is essentially the same as the first described structure.

Figure 5:
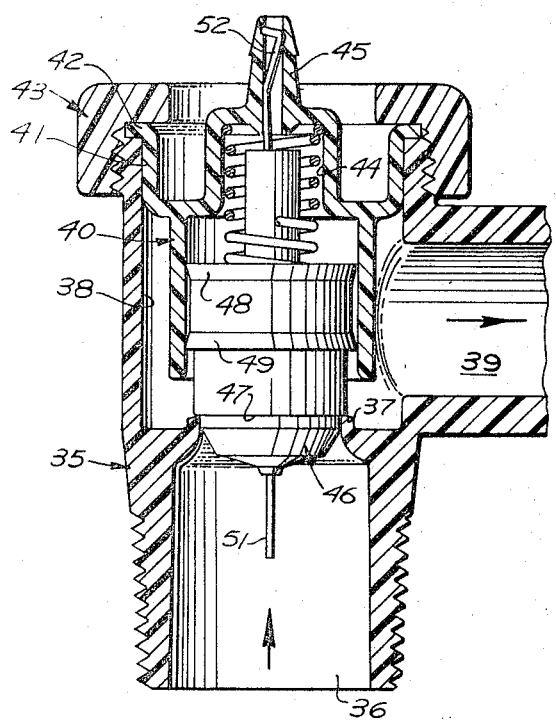
FIGURE 5 is a fragmentary sectional view showing a further modified form of the piston valve which is provided with means for receiving pressure fluid from the upstream side of the valve, a valve being provided with means to cause oscillation when in its open position for the purpose of maintaining the pressure fluid passage open.
Figure 6:
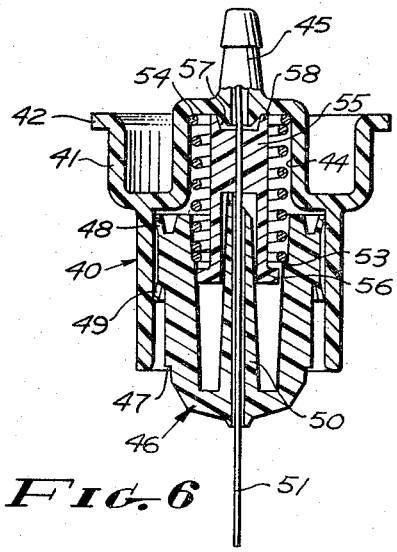
FIGURE 6 is a sectional view of the piston valve member and its cylinder, the piston valve member being shown in one extreme position of its oscillation.
Figure 7:
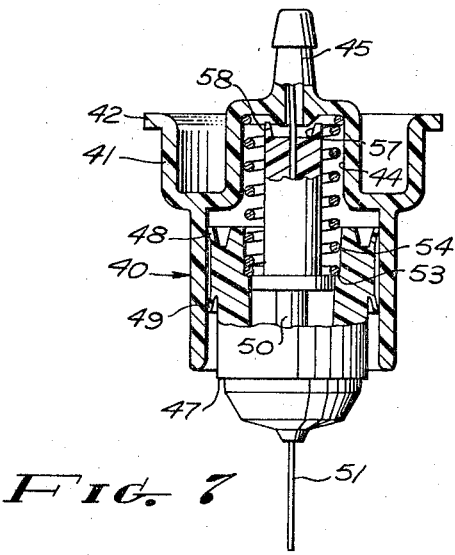
FIGURE 7 is a similar view showing the valve member in its other extreme position of oscillation.

Reference is now directed to FIGS. 5, 6, and 7. In the constructions previously described, the pressure fluid may be supplied from an extraneous source. In the construction shown in FIGS. 5, 6, and 7, the pressure fluid is supplied by means of a port extending upstream through the piston valve member. More particularly, a valve body 35 is provided having an inlet 36 terminating in a fixed valve seat 37. Beyond the valve seat, the valve body is enlarged to form a valve chamber 38 having a side outlet 39.

The valve body is open at its end opposite from the inlet 35 and is adapted to receive through its open end a valve cylinder 40 having an open end confronting the valve seat 37. The valve cylinder includes an enlarged, axially extending rim 41 which serves to center the valve cylinder in the valve body. The centering rim terminates in a radial flange 42 which fits over the open end of the valve body. The open end of the valve body receives an annular screw-threaded retainer cap 43 which clamps the flange 42.

The end of the valve cylinder 40 opposite from its open end is provided with a recess 44 which in turn is provided with a small tubular bleed stem 45.

The valve cylinder 40 receives a piston valve member 46 which is cup-shaped and formed of polyethylene resin as in the case of the piston valve member 10. The closed end of the piston valve member 46 is provided with an integral traveling valve seat 47 which engages the fixed valve seat 37. The side walls of the piston valve member 46 are provided with axially oppositely directed sealing lips 48 and 49 corresponding to the sealing lips 13 and 14.

In addition, the piston valve member 46 is provided with a centrally-located inlet tube 50 having a bore of small diameter. A metering pin 51 extends through the inlet tube 50 and is provided at one end with offset portions 52 which may be forced into the bore of the bleed stem 45 so that the metering may be anchored in place.

Internally, the piston valve 46 is provided with a shoulder 53 which is engaged by one end of a spring 54, the other end of which extends into the recess 44.

Slidable on the metering pin 51 is an oscillation member 55 in the form of a cylinder having a flange 56 at one end which is slightly larger than the inside diameter of the spring 54 but capable of axial movement within the piston valve member below its shoulder 53. The upper end of the oscillation member 55 is provided with a shallow recess 57 surrounded by an axially-directed valve lip 58 attached to engage the upper end of the recess 44 and seal the bleed stem 45.

Operation of the piston valve shown in FIGS. 5, 6, and 7 is as follows:

The bleed stem 45 communicating with the valve cylinder 40 is normally closed. Pressure fluid from the upstream side of the piston valve member 46 enters through the tube 50 to exert a force on the piston valve member in excess of the force applied upstream thereof due to the fact that the area of the valve cylinder 40 is greater than the area of the valve seat 37. When it is desired to open the valve, fluid is bled from the stem 45.

One of the difficulties encountered with valves of this type is due to sealing of the passage through the valve member. In the present instance, this condition is avoided or minimized by causing the piston valve member to ocsillate or to "hunt" when in its open position. This is accomplished by the action of the oscillation member 55. When the piston valve member 47 initially opens, it moves to the position shown in FIG. 6 and the inlet tube 50 forces the oscillation member to seal the bleed stem 45. This causes the pressure to build up in the valve cylinder 40 so that the valve member is urged toward its closed position. However, after a predetermined short travel of the piston valve member, the flange 56 is engaged by the spring 54 as shown in FIG. 7 to draw the oscillation member 55 away from the bleed stem 45, causing the pressure to drop so that the piston valve returns to the position shown in FIG. 6. This continued "hunting" movement prevents the collection of material on the metering pin 51 or around the entrance end of the inlet tube 50.

While a particular embodiment of this invention has been shown and described, it is not intended to limit the same to the exact details of the construction set forth, and it embraces such changes, modifications, and equivalents of the parts and their formation and arrangement as come within the purview of the appended claims.

I claim:
1. A valve, comprising:
   (a) a valve body structure including a fixed annular valve seat, a confronting coaxially disposed valve cylinder, an inlet port upstream from said valve seat and an outlet port downstream from said valve seat said valve cylinder having a bleed port at its end remote from said fixed valve seat;
   (b) a piston valve slidable in said cylinder and engagable with said fixed valve seat, said piston valve forming with said cylinder a pressure chamber of greater area than said fixed valve seat, and having a meter port of small diameter extending therethrough to receive fluid from upstream of said fixed valve seat;
   (c) a meter pin anchored in said cylinder and ex- tending through said meter port to form therewith a passage smaller than said bleed port;

(d) and means for causing said piston valve to reciprocate between its fully open position and a near-open position to maintain a wiping action between said meter port and said meter pin.

2. A valve, comprising:

(a) a valve body structure including a fixed annular valve seat, a confronting coaxially disposed valve cylinder, an inlet port upstream from said valve seat and an outlet port downstream from said valve seat said valve cylinder having a bleed port at its end remote from said fixed valve seat;

(b) a piston valve slidable in said cylinder and engagable with said fixed valve seat, said piston valve forming with said cylinder a pressure chamber of greater area than said fixed valve seat, and having a meter port of small diameter extending therethrough to receive fluid from upstream of said fixed valve seat;

(c) a meter pin anchored in said cylinder and extending through said meter port to form therewith a passage smaller than said bleed port;

(d) a reciprocable sealing member in said pressure chamber, between said piston valve and said bleed port said sealing member being engageable by said piston valve as it moves to its fully open position to close said bleed port, thereby causing said piston valve to recede from its fully open position as fluid enters said pressure chamber through said meter port;

(e) and a spring interposed between said sealing member and the bleed port end of said valve cylinder, said spring tending to open said bleed port as said valve element receeds from its fully open position, thereby to cause said piston valve to reciprocate when open, and maintain a wiping action between said meter port and meter pin.

References Cited by the Examiner

UNITED STATES PATENTS

| | | | |
|---|---|---|---|
| 726,395 | 4/1903 | Bedworth | 137—244 X |
| 2,154,811 | 4/1939 | Goss | 137—244 X |
| 2,603,951 | 7/1952 | Ross | 137—525 X |
| 2,841,359 | 7/1958 | Berck | 251—63 X |
| 2,956,579 | 10/1960 | Moore | 137—525 X |
| 3,178,150 | 4/1965 | Johnson | 251—63 |
| 3,203,663 | 8/1965 | Basham | 251—63 |

CLARENCE R. GORDON, *Primary Examiner.*